(12) United States Patent
Sadakiyo et al.

(10) Patent No.: US 11,077,751 B2
(45) Date of Patent: Aug. 3, 2021

(54) CONTROL SYSTEM OF FOUR-WHEEL DRIVE VEHICLE AND CONTROL METHOD OF FOUR-WHEEL DRIVE VEHICLE

(71) Applicant: Honda Motor Co.,Ltd., Tokyo (JP)

(72) Inventors: Masayuki Sadakiyo, Saitama (JP); Akiko Nakagawara, Saitama (JP); Takuro Shimizu, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 197 days.

(21) Appl. No.: 16/568,209

(22) Filed: Sep. 11, 2019

(65) Prior Publication Data

US 2020/0086741 A1 Mar. 19, 2020

(30) Foreign Application Priority Data

Sep. 18, 2018 (JP) .............................. JP2018-173974

(51) Int. Cl.
*G06K 9/66* (2006.01)
*B60K 23/08* (2006.01)
(Continued)

(52) U.S. Cl.
CPC ............ *B60K 23/0808* (2013.01); *B60K 6/52* (2013.01); *B60W 10/119* (2013.01);
(Continued)

(58) Field of Classification Search
CPC .................. B60K 23/0808; B60K 6/52; B60K 2023/0833; B60K 2023/085; B60K 23/08; B60W 10/119; B60W 30/18172; B60W 2040/1307; B60W 2520/263; B60W 2510/0676; B60W 2530/10;
(Continued)

(56) References Cited

U.S. PATENT DOCUMENTS 5,839,084 A * 11/1998 Takasaki ................ B60K 17/35
701/67
2002/0033293 A1* 3/2002 Fukuda .............. B60K 23/0808
180/250

(Continued)

FOREIGN PATENT DOCUMENTS

JP 63188528 A * 8/1988
JP S63188528 8/1988
(Continued)

*Primary Examiner* — Jonathan M Dager
*Assistant Examiner* — Jean W Charleston
(74) *Attorney, Agent, or Firm* — JCIPRNET (57) ABSTRACT

A weight ratio of each driving wheel of the vehicle at the time of automatic driving is calculated, a front and rear distribution ratio of a driving force of the vehicle is calculated from the weight ratio, a rear wheel plan driving force is calculated from the front and rear distribution ratio and an action plan required driving force, and a temperature of a rear wheel motor is estimated. Then, when the estimated attainment temperature of the rear wheel motor is higher than the upper limit value of the temperature, the front and rear distribution ratio is changed within a range in which excessive slip does not occur at the front wheels, the rear wheel plan driving force is recalculated, and the automatic driving of the vehicle is implemented taking the rear wheel plan driving force as a target driving force.

2 Claims, 3 Drawing Sheets

(51) Int. Cl.
*B60K 6/52* (2007.10)
*B60W 10/119* (2012.01)
*B60W 30/18* (2012.01)
*B60W 40/13* (2012.01)

(52) U.S. Cl.
CPC ............ *B60W 30/18172* (2013.01); *B60K 2023/0833* (2013.01); *B60W 2040/1307* (2013.01); *B60W 2520/263* (2013.01)

(58) Field of Classification Search
CPC ....... B60W 30/1843; B60W 2720/403; B60W 2510/087; B60W 30/18; B60W 20/00; B60W 2520/403; Y02T 10/62; Y02T 10/72
USPC .......................................................... 701/22
See application file for complete search history.

(56) References Cited

U.S. PATENT DOCUMENTS

| | | | | |
|---|---|---|---|---|
| 2004/0211611 | A1* | 10/2004 | Ohno | B60K 23/0808 180/244 |
| 2015/0073670 | A1* | 3/2015 | Matsuno | B60K 17/35 701/53 |
| 2015/0142280 | A1* | 5/2015 | Tamoto | B60W 30/19 701/53 |
| 2017/0166053 | A1* | 6/2017 | Ogawa | B60K 17/35 |
| 2018/0118024 | A1* | 5/2018 | Watanabe | B60K 17/3505 |
| 2019/0389305 | A1* | 12/2019 | Shimizu | B60W 30/18172 |

FOREIGN PATENT DOCUMENTS

| | | |
|---|---|---|
| JP | 2005059851 | 3/2005 |
| JP | 2005059851 A * | 3/2005 |

* cited by examiner

FIG.3

CONTROL SYSTEM OF FOUR-WHEEL DRIVE VEHICLE AND CONTROL METHOD OF FOUR-WHEEL DRIVE VEHICLE

CROSS-REFERENCE TO RELATED APPLICATION

This application claims the priority benefits of Japan Patent Application No. 2018-173974, filed on Sep. 18, 2018. The entirety of the above-mentioned patent application is hereby incorporated by reference herein and made a part of this specification.

BACKGROUND

Technical Field

The disclosure relates to a control system of a four-wheel drive vehicle and a control method of a four-wheel drive vehicle, in particular, to a control system of a four-wheel drive vehicle and a control method of a four-wheel drive vehicle, which avoid excessive heating of rear wheels to make preferable automatic driving possible even when towed climbing is carried out by automatic driving.

Related Art

Conventionally, some four-wheel drive vehicles are configured to drive front wheels (the front, front axles) by an engine or an engine and a motor and drive rear wheels (the rear, rear axles) by a motor.

In addition, some four-wheel drive vehicles are also configured to include, for example, a vehicle start determination part, an acceleration operation determination part, a low-temperature state determination part and a wheel slip determination part, and to be controlled to be in four-wheel drive in which the front wheels and the rear wheels are driven when a drive state of the vehicle is any one of a start state, an acceleration state, and a low friction coefficient road surface travel state, and to be in two-wheel drive in which the front wheels or the rear wheels are driven when the vehicle is not in any one of the states (for example, with reference to patent literature 1).

In the case of this configuration, by using the four-wheel drive in which the front wheels and the rear wheels are automatically driven when the vehicle is in any one of the start state, the acceleration state, and the low friction coefficient road surface travel state, unnecessary four-wheel drive can be avoided according to the drive state and overheating of a motor can be suppressed.

Furthermore, some four-wheel drive vehicles are also configured to be capable of suppressing air pollution and generation of noise by detecting an emission amount of $NO_2$ relative to a treading amount of an accelerator and controlling an engine output and a motor output according to the $NO_2$ amount (for example, with reference to patent literature 2).

On the other hand, as is well-known, research and development related to automatic driving technology is actively promoted, and development and practical use of four-wheel drive vehicles which can switch between automatic driving and manual driving are promoted.

LITERATURE OF RELATED ART

Patent Literature

[Patent literature 1] Japanese Laid-Open No. 2005-59851
[Patent literature 2] Japanese Laid-Open No. 1988-188528

Here, conventionally, when towed climbing is carried out by automatic driving, for example, when a four-wheel drive vehicle capable of automatic driving is used to load, for example, a personal watercraft or a boat on a trailer (a towed vehicle) to tow and pull up the personal watercraft or the boat by automatic driving using a gentle slope of a boat lift yard, the situation is dealt with in a manner that detection accuracy of front and rear weights is improved based on information acquired from an in-camera or the like mounted in the vehicle, and a driving force corresponding to a front and rear weight ratio is distributed to the front wheels and the rear wheels.

However, if a weight ratio in a vehicle state is estimated by the in-camera or the like and driving distribution is carried out by the weight ratio in this way, it is also considered that the weight ratio of the rear wheels (a weight distribution ratio) becomes extremely large and the rear wheels heat excessively, making it impossible to continue the towed climbing.

SUMMARY

The disclosure provides a control system of a four-wheel drive vehicle and a control method of a four-wheel drive vehicle, which suppress heating of rear wheels to make preferable automatic driving possible even when towed climbing is carried out by automatic driving.

(1) The disclosure is a control system of a four-wheel drive vehicle which is capable of driving automatically and in which a driving source of rear wheels is a motor. The control system includes: a weight ratio calculation portion, which calculates a weight ratio of each driving wheel of the vehicle at the time of automatic driving; a front and rear distribution ratio calculation portion, which calculates a front and rear distribution ratio of a driving force of the vehicle from the weight ratio calculated by the weight ratio calculation portion; a rear wheel plan driving force calculation portion, which calculates a rear wheel plan driving force based on the front and rear distribution ratio obtained by the front and rear distribution ratio calculation portion and an action plan; a motor attainment temperature estimation portion, which estimates an attainment temperature of a rear wheel motor at the time of automatically driving with the rear wheel plan driving force obtained by the rear wheel plan driving force calculation portion; a motor temperature determination portion, which determines whether the attainment temperature of the rear wheel motor estimated by the motor attainment temperature estimation portion is lower than an upper limit temperature set in advance; and a vehicle control portion, which drives and controls the vehicle taking the rear wheel plan driving force as a target driving force when a determination is made that the attainment temperature of the rear wheel motor estimated by the motor temperature determination portion is lower than the upper limit temperature set in advance, and when a determination is made that the attainment temperature of the rear wheel motor estimated by the motor temperature determination portion is higher than the upper limit temperature set in advance, changes the front and rear distribution ratio within a range in which excessive slip does not occur at the front wheels and drives and controls the vehicle taking the rear wheel plan driving force under which the attainment temperature of the rear wheel motor being estimated is lower than the upper limit temperature set in advance as the target driving force.

(2) The disclosure is a control method of a four-wheel drive vehicle which is capable of driving automatically and in which a driving source of rear wheels is a motor. The method includes: a weight ratio calculation process, in which a weight ratio of each driving wheel of the vehicle at the time of automatic driving is calculated; a front and rear distribution ratio calculation process, in which a front and rear distribution ratio of a driving force of the vehicle is calculated from the weight ratio calculated in the weight ratio calculation process; a rear wheel plan driving force calculation process, in which a rear wheel plan driving force is calculated from the front and rear distribution ratio calculated in the front and rear distribution ratio calculation process and an action plan required driving force; a rear wheel motor temperature estimation process, in which a temperature of a rear wheel motor in the case of being driven by the rear wheel plan driving force calculated in the rear wheel plan driving force calculation process is estimated; a rear wheel motor temperature determination process, in which a confirmation is made on whether an attainment temperature of the rear wheel motor estimated in the rear wheel motor temperature estimation process is lower than an upper limit value of the temperature in the action plan; a rear wheel plan driving force recalculation process, in which when a determination is made that the attainment temperature of the rear wheel motor estimated in the rear wheel motor temperature determination process is higher than the upper limit value of the temperature, the front and rear distribution ratio is changed within a range in which excessive slip does not occur at the front wheels, and the rear wheel plan driving force under which the attainment temperature of the rear wheel motor being estimated is lower than the upper limit temperature set in advance is recalculated; an automatic driving implementation process, in which the automatic driving of the vehicle is implemented taking the rear wheel plan driving force under which the attainment temperature of the rear wheel motor being estimated is lower than the upper limit temperature set in advance as a target driving force.

DESCRIPTION OF THE EMBODIMENTS

Here, it can be assumed that on a dry road surface in a high friction coefficient state or the like, the four-wheel drive vehicle travels as tiny slip always occurs in the driving wheels. Based on this, "excessive slip" in the disclosure means slip of the driving wheels excluding such tiny slip.

In the disclosures aforementioned, the inconvenience that the distribution to the rear wheels becomes large corresponding to the weight ratio and the rear wheels heat excessively can be eliminated even if towed climbing is carried out by the automatic driving.

According to the disclosure, when towed climbing is carried out by the automatic driving, by carrying out the control in which the front and rear distribution amount is changed corresponding to the temperature of the rear wheel motor instead of dealing with the situation only by the control in which the driving force is distributed to the front wheels and the rear wheels corresponding to the front and rear weight ratio in the conventional way, the rear wheel heating is suppressed, the excessive slip is suppressed, and it is possible for climbing automatic driving to be preferably carried out. Therefore, compared with before, drivability and merchantability of the 4WD can be improved, and compatibility between the drivability and the merchantability of the 4WD can be achieved.

In the following, a control system of a four-wheel drive vehicle and a control method of a four-wheel drive vehicle according to one embodiment of the disclosure is described with reference to FIG. 1 to FIG. 3.

Here, the embodiment relates to the control system of a four-wheel drive vehicle and the control method of a four-wheel drive vehicle, in which front wheels (the front, front axles) are driven by an engine or an engine and a motor and rear wheels (the rear, rear axles) are driven by a motor.

Figure 1:
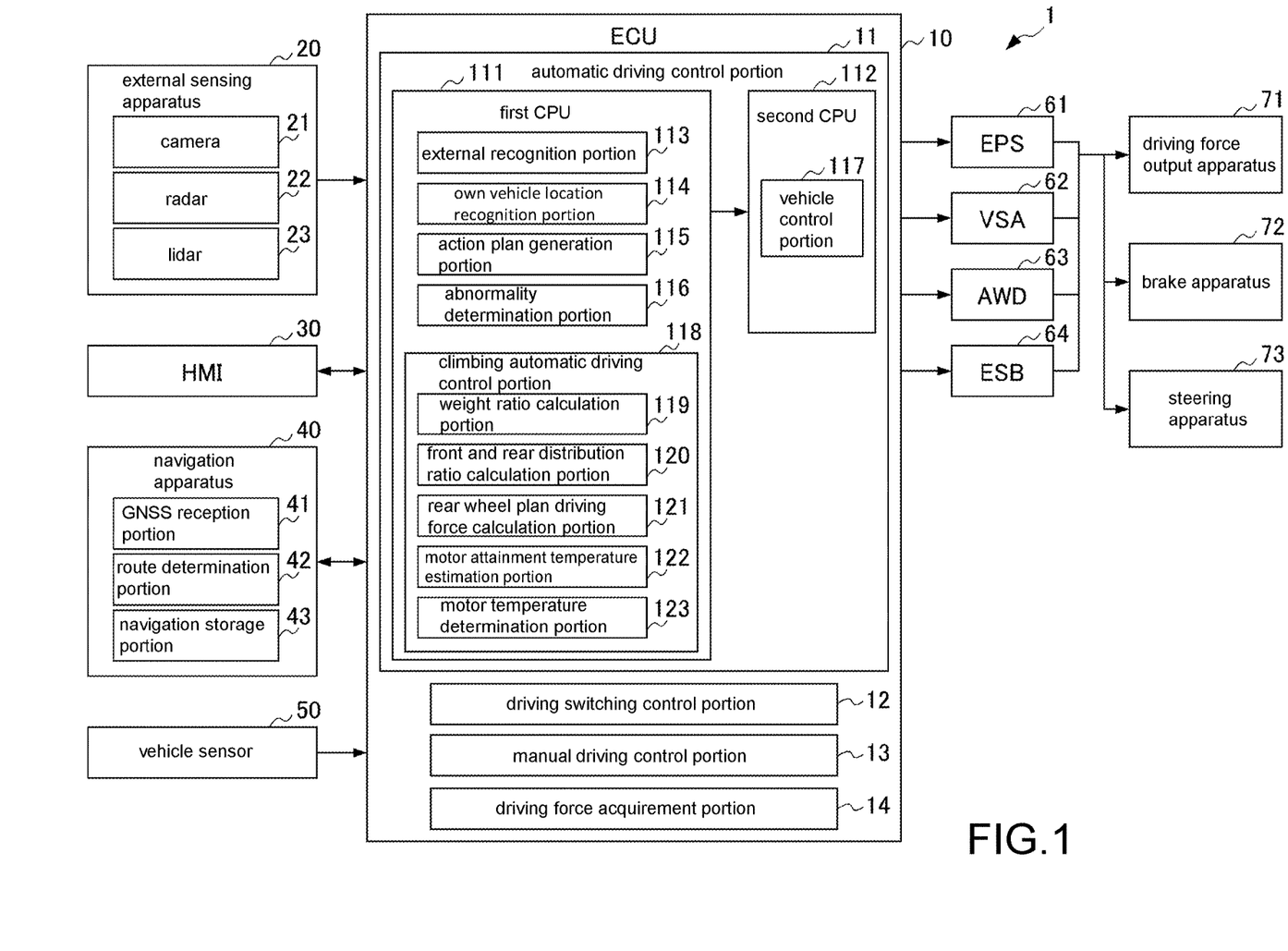
FIG. 1 is a diagram showing a configuration of a control system of a four-wheel drive vehicle according to one embodiment of the disclosure.

Specifically, first, as shown in FIG. 1, a vehicle control system (a control system of a four-wheel drive vehicle) 1 mounted to the vehicle of the embodiment includes an ECU (Electronic Control Unit) 10, an external sensing apparatus 20, an HMI (Human Machine Interface) 30, a navigation apparatus 40, a vehicle sensor 50, an EPS (Electric Power Steering) 61, a VSA (Vehicle Stability Assist) 62, an AWD (All-Wheel-Drive) 63, an ESB (Electric Servo Brake) 64, a driving force output apparatus 71, a brake apparatus 72, and a steering apparatus 73.

The external sensing apparatus 20 includes a camera 21, a radar 22, and a lidar 23.

At least one camera 21 is arranged at any place of the own vehicle and captures images of the surroundings of the own vehicle to acquire image information. The camera 21 is a monocular camera or a stereo camera, and for example a digital camera using a solid-state imaging element, such as a CCD (Charge Coupled Device), a CMOS (Complementary Metal Oxide Semiconductor) or the like, is used.

At least one radar 22 is arranged at any place of the own vehicle and detects a location (a distance and an orientation) of an object existing in the surroundings of the own vehicle. Particularly, the radar 22 irradiates electromagnetic waves such as millimeter waves to the surroundings of the vehicle and detects reflected waves of the irradiated electromagnetic waves reflected by the object, thereby detecting the location of the object.

At least one lidar 23 is arranged at any place of the own vehicle and detects the location (the distance and the orientation) or nature of an object existing in the surroundings of the own vehicle. Particularly, the lidar 23 irradiates, in pulses, electromagnetic waves (electromagnetic waves such as ultraviolet light, visible light, and near infrared light) whose wavelength is shorter than the millimeter waves to the surroundings of the vehicle, and detects scattered waves of the irradiated electromagnetic waves scattered by the object, thereby detecting the location and the nature of the object existing at a further distance than the radar 22.

The external sensing apparatus 20 functions as an ADAS (Advanced Driver Assistance Systems). Particularly, the external sensing apparatus 20 comprehensively evaluates, by sensor fusion technology, each information acquired by the camera 21, the radar 22 and the lidar 23 or the like, and outputs more accurate information to the ECU 10 described later in detail.

The HMI 30 is an interface which presents various information to a driver or the like and accepts input operations performed by the driver or the like. The HMI 30 includes, for example, a display apparatus, a seat belt apparatus, a handle touch sensor, a driver monitor camera, and various operation switches or the like, any of which is not shown in the diagram.

The display apparatus is, for example, a touch panel type display apparatus which displays an image and accepts operations performed by the driver or the like. The seat belt apparatus includes a seat belt pretensioner for example, and vibrates the seat belt to inform and warn the driver for example when switching from automatic driving to manual driving is executed regardless of the driver's intention due to vehicle failure or the like. The handle touch sensor is arranged on a steering wheel of the vehicle and detects contact of the driver with the steering wheel and a pressure at which the driver holds the steering wheel. The driver monitor camera captures images of the face and the upper body of the driver. The various operation switches include, for example, a GUI (Graphical User Interface) type or a mechanical type automatic driving switching switch or the like for instructing start and stop of the automatic driving. In addition, the HMI 30 may include various communication apparatuses having a function of communicating with the outside.

The navigation apparatus 40 includes a GNSS (Global Navigation Satellite System) reception portion 41, a route determination portion 42, and a navigation storage portion 43. In addition, the navigation apparatus 40 includes, within the HMI 30, a display apparatus or a speaker, operation switches or the like for the driver to use the navigation apparatus 40.

The GNSS reception portion 41 specifies the location of the vehicle based on a reception signal from a GNSS satellite. However, the location of the vehicle may also be specified according to information acquired from the vehicle sensor 50 described later in detail.

The route determination portion 42 determines, with reference to map information stored in the navigation storage portion 43 described later in detail, for example a route from the location of the own vehicle specified by the GNSS reception portion 41 to a destination input by the driver or the like. The route determined by the route determination portion 42 is guided to the driver or the like by the display apparatus, the speaker or the like in the HMI 30.

The navigation storage portion 43 stores a highly accurate map information MPU (Map Position Unit). The map information includes, for example, a type of a road, the number of lanes of a road, locations of emergency parking zones, widths of lanes, slopes of a road, a location of a road, curvature of lane curves, merging and branching point locations of lanes, information of road signs or the like, location information of intersections, information about existence of a traffic light, location information of stop lines, traffic jam information, information of other vehicles, and the like.

Furthermore, the navigation apparatus 40 may also be configured, for example, by a terminal apparatus such as a smartphone, a tablet terminal or the like. In addition, the navigation apparatus 40 includes various cellular networks, a vehicle mounted communication unit TCU (Telematics Communication Unit) or the like, any of which is not shown in the diagram, and is capable of transmission and reception with cloud servers or the like. In this way, the vehicle location information or the like is transmitted to the outside and the map information is updated as needed.

The vehicle sensor 50 includes a plurality of sensors for detecting various behaviors of the own vehicle. For example, the vehicle sensor 50 includes a vehicle speed sensor detecting a speed of the own vehicle (vehicle speed), a wheel speed sensor detecting a speed of each wheel of the own vehicle, a front and rear acceleration sensor detecting acceleration and deceleration of the own vehicle, a lateral acceleration sensor detecting lateral acceleration of the own vehicle, a yaw rate sensor detecting a yaw rate of the own vehicle, an orientation sensor detecting a direction of the own vehicle, a slope sensor detecting a slope of the own vehicle, and the like.

In addition, the vehicle sensor 50 includes a plurality of sensors detecting operation amounts of various operation devices. For example, the vehicle sensor 50 includes an accelerator pedal sensor detecting a treading (an opening degree) amount of an accelerator pedal, a steering angle sensor detecting the operation amount of the steering wheel (a steering angle), a torque sensor detecting a steering torque, a brake pedal sensor detecting a treading amount of a brake pedal, a shift sensor detecting a location of a shift lever, and the like.

The EPS 61 is a so-called electric power steering apparatus. The EPS 61 includes an EPS·ECU not shown in the diagram, and changes a direction of the wheel (the steering wheel) by controlling the steering apparatus 73 described later according to a control command output from the ECU 10 described later in detail.

The VSA 62 is a so-called vehicle behavior stabilization control apparatus. The VSA 62 includes a VSA·ECU not shown in the diagram, and has an ABS (antilock brake system) function of preventing lock of the wheels during a braking operation, a TCS (traction control system) function of preventing idling of the wheels during acceleration, a function of suppressing side slips during turning or the like, and a function of carrying out emergency braking control regardless of a braking operation of the driver during collision of the own vehicle. In order to realize these functions, the VSA 62 supports behavior stabilization of the vehicle by adjusting a braking fluid pressure generated by the ESB 64 described later.

The VSA 62 controls the brake apparatus 72 described later based on the vehicle speed, the steering angle, the yaw rate, the lateral acceleration and the like detected by the vehicle speed sensor, the steering angle sensor, the yaw rate sensor and the lateral acceleration sensor. Particularly, a braking force of each wheel is controlled respectively to improve travel stability by controlling a fluid pressure unit which supplies the brake fluid pressure to a brake cylinder of each of the front, rear, left and right wheels.

The AWD 63 is a so-called four-wheel driving force flexible control system and functions as a driving force distribution control portion. That is, the AWD 63 includes an AWD·ECU not shown in the diagram and flexibly controls driving force distribution of the front and rear wheels and the right and the left of the rear wheels. Particularly, the AWD 63 changes the driving force distribution between the front, rear, right and left wheels by controlling a magnetic clutch, a drive motor or the like within the front, rear, right and left driving force distribution unit based on the vehicle speed, the steering angle, the yaw rate, the lateral acceleration and the like detected by the vehicle speed sensor, the steering angle sensor, the yaw rate sensor and the lateral acceleration sensor.

The ESB 64 includes an ESB·ECU not shown in the diagram, and generates braking forces on the wheels by controlling the brake apparatus 72 described later according to the control command output from the ECU 10 described later in detail.

The driving force output apparatus 71 includes an engine and a motor which are driving sources of the own vehicle. The driving force output apparatus 71 generates a travel driving force (a torque) under which the own vehicle travels according to the control command output from the ECU 10 described later in detail and transmits the travel driving force to each wheel via a transmission.

The brake apparatus 72 is configured, for example, by an electric servo brake combined with a hydraulic brake. The brake apparatus 72 brakes the wheels according to the control command output from the ECU 10.

The steering apparatus 73 is controlled by the EPS 61 and changes the direction of the wheel (the steering wheel).

Next, the ECU 10 included in the vehicle control system (the control system of a four-wheel drive vehicle) 1 according to the embodiment is described in detail.

As shown in FIG. 1, the ECU 10 includes an automatic driving control portion 11, a driving switching control portion 12, a manual driving control portion 13, and a driving force acquirement portion 14.

The automatic driving control portion 11 includes a first CPU 111 and a second CPU 112.

The first CPU 111 includes an external recognition portion 113, an own vehicle location recognition portion 114, an action plan generation portion 115, and an abnormality determination portion 116.

The external recognition portion 113 recognizes an external object (a recognition target) and recognizes its location based on the various information acquired by the external sensing apparatus 20. Particularly, the external recognition portion 113 recognizes obstacles, road shapes, traffic lights, guardrail, telephone poles, surrounding vehicles (including a travel state such as a speed, an acceleration or the like and a parking state), lane marks, walkers and the like and recognizes their locations.

The own vehicle location recognition portion 114 recognizes a current location and a posture of the own vehicle based on the location information of the own vehicle measured by the navigation apparatus 40 and the various sensor information detected by the vehicle sensor 50. Particularly, the own vehicle location recognition portion 114 recognizes a travel lane in which the own vehicle is travelling, and recognizes a relative location and posture of the own vehicle with respect to this travel lane by comparing the map information and the images acquired by the camera 21.

The action plan generation portion 115 generates an action plan of the automatic driving until the own vehicle reaches the destination or the like. Specifically, the action plan generation portion 115 generates, based on the external information recognized by the external recognition portion 113 and the own vehicle location information recognized by the own vehicle location recognition portion 114, the action plan of the automatic driving in a manner of being capable of traveling on the route determined by the route determination portion 42 while dealing with the situation of the own vehicle and the surrounding situation.

Specifically, the action plan generation portion 115 generates a target track along which the own vehicle is about to travel. The action plan generation portion 115 generates a plurality of target track candidates and selects an optimal target track at that time from the viewpoint of safety and efficiency. In addition, the action plan generation portion 115 generates, for example, an action plan for stopping the own vehicle at a safe location (an emergency parking zone, a roadside zone, a road shoulder, a parking area or the like) when the abnormality determination portion 116 described later in detail determines that an occupant or the own vehicle is in an abnormal state.

The abnormality determination portion 116 determines whether at least one of the driver and the own vehicle is in the abnormal state. The abnormal state of the driver means, for example, a deterioration in physical condition, and includes a state in which the occupant is sleeping or a state of unconsciousness due to illness or the like. In addition, the abnormal state of the own vehicle means failure or the like of the own vehicle.

Specifically, the abnormality determination portion 116 determines the abnormal state of the driver by analyzing the images acquired by the driver monitor camera. In addition, the abnormality determination portion 116 determines that the driver is in the abnormal state if the manual driving operation of the driver is not detected even though the driver is notified of warning by display, sound, seat belt vibration or the like for predetermined times or more when the automatic driving is forcibly switched to manual driving regardless of the intention of the driver due to, for example, the failure or the like of the own vehicle. The manual driving operation of the driver is detected by the handle touch sensor, the accelerator pedal sensor, the brake pedal sensor and the like.

In addition, the abnormality determination portion 116 also determines as an abnormal state when generation of a great yaw rate during automatic driving and obstacles or the like on the road are detected. Furthermore, presence or absence of the failure of the own vehicle is detected based on the various sensor information acquired by the vehicle sensor 50 and the like, and the determination that the own vehicle is in an abnormal state is made when failure is detected.

The second CPU 112 includes a vehicle control portion 117. The external information, the own vehicle location information, the action plan and the abnormality information acquired by the first CPU 111 are input to the vehicle control portion 117.

The vehicle control portion 117 begins/stops the automatic driving according to an automatic driving begin/stop signal input from the automatic driving switching switch. In addition, the vehicle control portion 117 controls the driving force output apparatus 71, the brake apparatus 72 and the steering apparatus 73 via the EPS 61, the VSA 62, the AWD 63, the ESB 64 and the like so that the own vehicle travels at the target speed along the target track generated by the action plan generation portion 115.

The driving switching control portion 12 alternately switches each driving mode of the automatic driving and the manual driving according to the signal input from the automatic driving switching switch. The driving switching control portion 12 switches the driving mode based on, for example, operations of instructing acceleration, deceleration or steering of the accelerator pedal, the brake pedal, the steering wheel or the like. In addition, the driving switching control portion 12 executes the switching from the automatic driving to the manual driving in vicinity of a predefined end location of the automatic driving or the like set by the action plan generated by the action plan generation portion 115. In addition, the driving switching control portion 12 avoids execution of automatic driving control and executes the switching to manual driving control when an abnormal state is determined by the abnormality determination portion 116 because of the detection of the failure of the own vehicle, the generation of the great yaw rate, and the obstacles such as falling objects on the road, or the like.

The driving force acquirement portion 14 calculates and acquires a required driving force output from the driving force output apparatus 71 such as an electric motor or the like. Particularly, the driving force acquirement portion 14 acquires, using a map or the like stored in advance and based on the vehicle speed acquired by the vehicle speed sensor, an operation amount of the accelerator pedal acquired by the accelerator pedal sensor, an operation amount of the brake pedal acquired by the brake pedal sensor and the like, the required driving force output from an output shaft.

Here, when towed climbing is carried out by automatic driving in a conventional control system of a four-wheel drive vehicle, for example, a personal watercraft or a boat is loaded on a trailer (a towed vehicle) and towed, and is pulled up by the automatic driving using a gentle slope of a boat lift yard, detection accuracy of front and rear weights is improved based on information acquired from an in-camera or the like mounted in the vehicle, and a driving force corresponding to a front and rear weight ratio is distributed to the front and the rear, thereby dealing with the situation.

In contrast, in the control system 1 of a four-wheel drive vehicle of the embodiment, a climbing automatic driving control portion 118 is arranged on the first CPU 111 of the ECU 10.

Furthermore, the climbing automatic driving control portion 118 includes: a weight ratio calculation portion 119, which calculates the weight ratio of each driving wheel according to a climbing angle, an occupant number, a towing state or the like; a front and rear distribution ratio calculation portion 120, which calculates a front and rear distribution ratio from the weight ratio calculated by weight ratio calculation portion 119; a rear wheel plan driving force calculation portion 121, which calculates a rear wheel plan driving force based on the front and rear distribution ratio obtained by the front and rear distribution ratio calculation portion 120 and the action plan; a motor attainment temperature estimation portion 122, which estimates an attainment temperature of a rear wheel motor when the driving is carried out with the rear wheel plan driving force obtained by the rear wheel plan driving force calculation portion 121; and a motor temperature determination portion 123, which determines whether the attainment temperature of the real wheel motor estimated by the motor attainment temperature estimation portion 122 is lower than an upper limit temperature set in advance.

That is, in the control system 1 of a four-wheel drive vehicle of the present embodiment, the control in which a front and rear driving force distribution amount is changed based on a temperature control state from the conventional control of the weight ratio are carried out to suppress overheating of the rear wheels while drivability only making the front wheels not slip and merchantability of the 4WD are assured from the action plan and a temperature rising prediction.

Furthermore, in a mechanic four-wheel drive vehicle with front and rear engine drive, the front, rear, right and left driving wheels are mechanically connected, and thus it is rare that only the front wheels slip excessively. That is, the front wheels and the rear wheels slip together at the time of the excessive slip, and thus it is not necessary to change the distribution amount in the temperature control state. In contrast, in an E4 drive vehicle using a motor as the four-wheel drive vehicle of the embodiment, the four driving wheels are not mechanically connected, and thus only the front wheels may slip excessively (each of the four driving wheels slips excessively).

More specifically, in the embodiment (in the control method of a four-wheel drive vehicle of the embodiment), control is carried out as follows when the towed climbing is carried out by the automatic driving.

Figure 2:
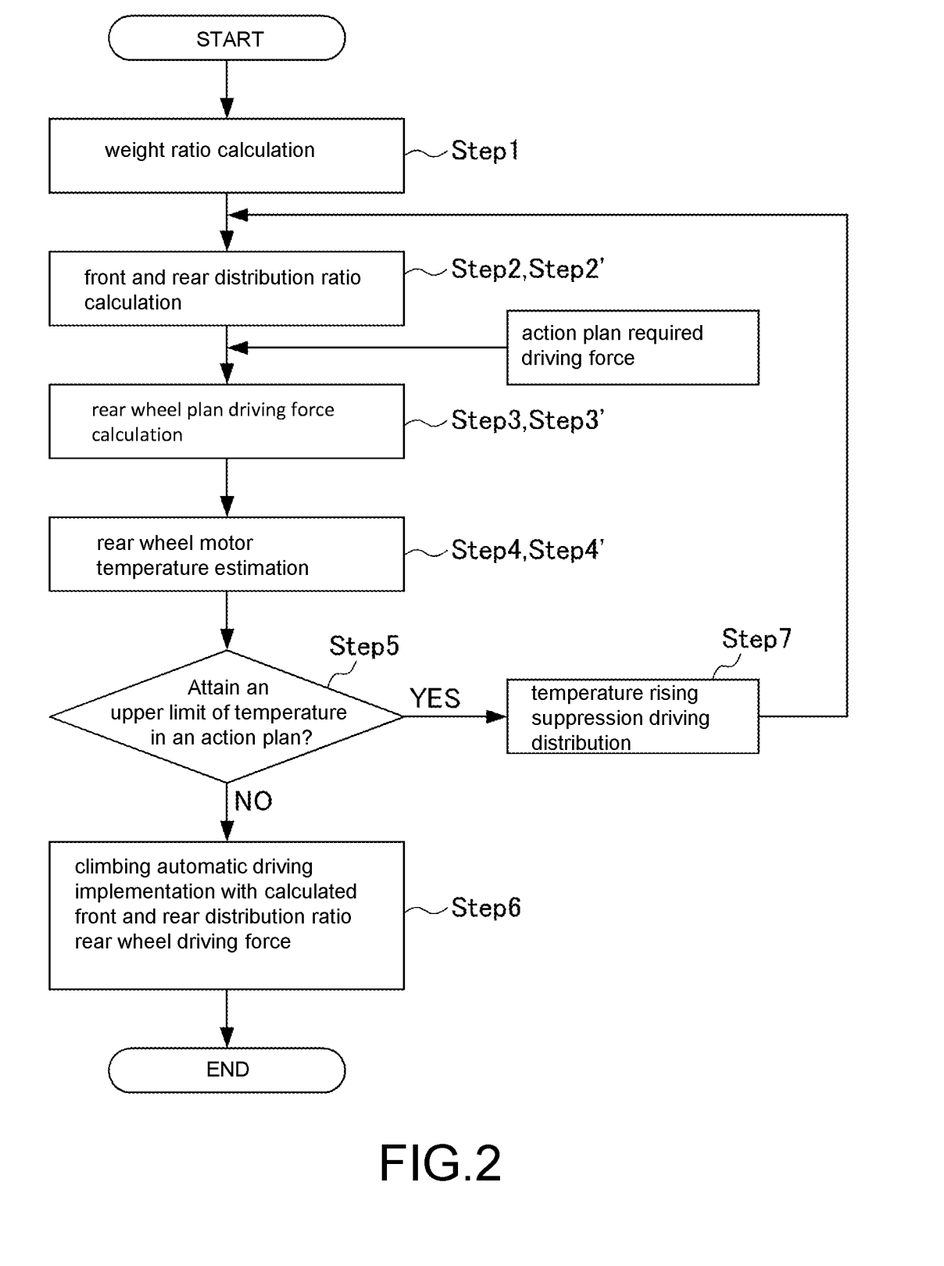
FIG. 2 is a flow diagram showing a control method of a four-wheel drive vehicle according to one embodiment of the disclosure.

As shown in FIG. 2 (and FIG. 1), first, a climbing angle is obtained from information of the angle sensor, the in-camera or the like, and the weight ratio is calculated from situations and conditions of the occupant number, a trailer state or the like (Step 1: weight ratio calculation process). In addition, the front and rear distribution ratio is calculated from the weight ratio (Step 2: front and rear distribution ratio calculation process).

Next, a rear wheel plan driving force is calculated from the calculated front and rear distribution ratio (a front/rear distribution ratio) and an action plan required driving force (Step 3: rear wheel plan driving force calculation process), and a temperature (a temperature transition, an attainment temperature) of the rear wheel motor when the driving is carried out with the rear wheel plan driving force is estimated (Step 4: rear wheel motor temperature estimation process). Furthermore, the estimation of the temperature of the rear wheel motor may be carried out based on, for example, a relationship prepared in advance between a rear wheel driving force, a rotation speed of the motor, an outside temperature or the like and the temperature of the rear wheel motor.

Next, a confirmation is made on whether the estimated attainment temperature of the rear wheel motor is lower than the upper limit value of the temperature in the action plan, that is, whether the temperature of the rear wheel motor in the action plan reaches the upper limit value (Step 5: rear wheel motor temperature determination process). If the estimated attainment temperature of the rear wheel motor is lower than the upper limit value of the temperature in the action plan, the climbing automatic driving is implemented setting the calculated front and rear distribution ratio and the rear wheel plan driving force as a target/set rear wheel driving force (Step 6: automatic driving implementation process).

On the other hand, when the estimated attainment temperature of the rear wheel motor is higher than the upper limit value of the temperature in the action plan, a setting study on temperature rising suppression driving distribution is implemented (Step 7: rear wheel plan driving force recalculation process).

Figure 3:
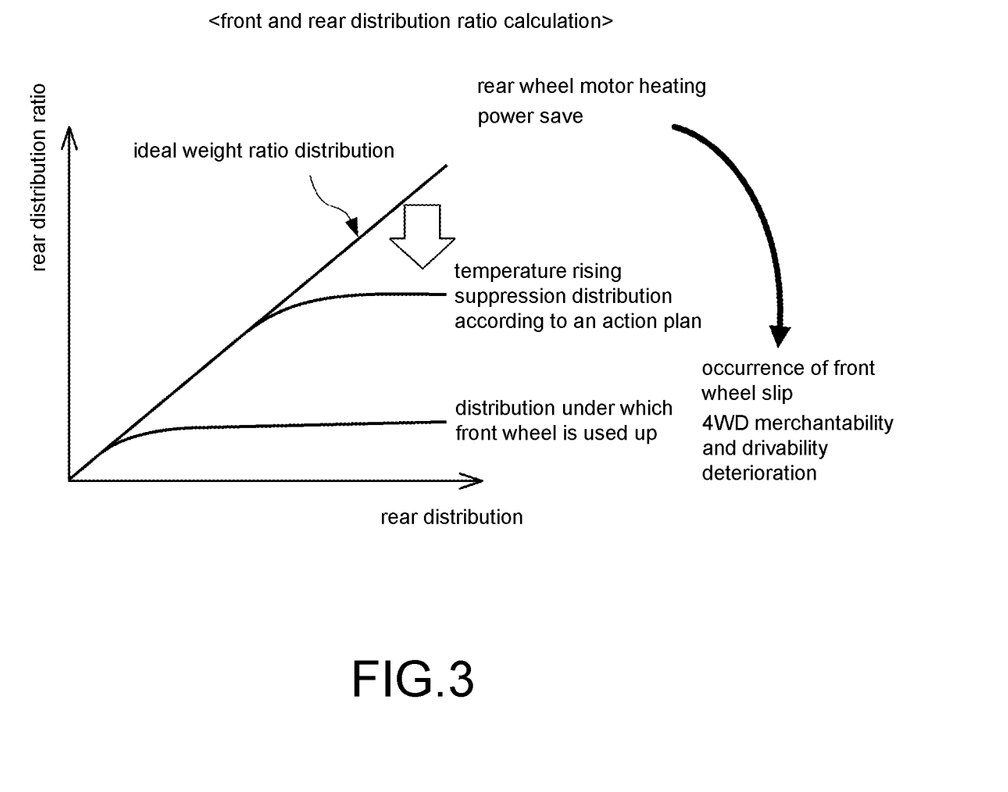
FIG. 3 is a diagram showing an approach to calculate a front and rear distribution ratio in the control method of a four-wheel drive vehicle according to one embodiment of the disclosure.

Specifically, in the setting study on the temperature rising suppression driving distribution, first, as shown in FIG. 3, the front and rear distribution ratio is corrected and reset to decrease the rear distribution ratio with respect to ideal weight ratio distribution (Step 2': rear wheel plan driving force recalculation process), the rear wheel plan driving force is recalculated from the front and rear distribution ratio and the action plan required driving force (Step 3'), and the temperature of the rear wheel motor is estimated (Step 4').

At this time, when the front and rear distribution ratio is corrected and reset, within a range in which slip does not occur at the front wheels, that is, within a range in which the drivability of the four-wheel drive vehicle and the merchantability as the four-wheel drive vehicle can be ensured and assured, the front and rear distribution ratio is reset to decrease the rear distribution ratio with respect to the ideal weight ratio distribution.

Then, the operation is carried out repeatedly until the estimate rear wheel motor temperature reaches a satisfactory heating temperature, a preferable plan driving force is obtained, and the drive control during the climbing automatic driving is carried out using the preferable plan driving force as the target rear wheel driving force.

In this way, in the control system 1 of a four-wheel drive vehicle and the control method of a four-wheel drive vehicle of the embodiment, the inconvenience that the rear distribution becomes large corresponding to the weight ratio and the rear wheels heat excessively can be eliminated even if the four-wheel drive vehicle is towed to climb by the automatic driving.

Therefore, according to the control system of the four-wheel drive vehicle and the control method of a four-wheel drive vehicle of the embodiment, when the towed climbing is carried out by the automatic driving, by carrying out the control in which the front and rear distribution amount is changed corresponding to the temperature of the rear wheel motor instead of dealing with the situation only by the control in which the driving force is distributed to the front wheels and the rear wheels corresponding to the front and rear weight ratio in the conventional way, the rear wheel heating is suppressed, the slip is suppressed, and it is possible for climbing automatic driving to be preferably carried out. Therefore, compared with before, drivability and merchantability of the 4WD can be improved, and compatibility between the drivability and the merchantability of the 4WD can be achieved.

One embodiment of the control system of the four-wheel drive vehicle and the control method of a four-wheel drive vehicle according to the disclosure is described hereinabove, but the disclosure is not limited to the one embodiment described above and can be appropriately changed without departing from the scope of the disclosure.

For example, in the embodiment, the four-wheel drive vehicle according to the disclosure is described as the four-wheel drive vehicle in which the front wheels (the front, the front axles) are driven by the engine and the rear wheels (the rear, the rear axles) are driven by the motor, but a four-wheel drive vehicle in which both the front wheels and the rear wheels are driven by a motor is also applicable. In this case, the same effect as that of the embodiment can also be obtained.

What is claimed is:

1. A control system of a four-wheel drive vehicle which is capable of driving automatically and in which a driving source of rear wheels is a motor, comprising:
    a weight ratio calculation portion, which calculates a weight ratio of each driving wheel at the time of automatic driving;
    a front and rear distribution ratio calculation portion, which calculates a front and rear distribution ratio of a driving force of the vehicle from the weight ratio calculated by the weight ratio calculation portion;
    a rear wheel plan driving force calculation portion, which calculates a rear wheel plan driving force based on the front and rear distribution ratio obtained by the front and rear distribution ratio calculation portion and an action plan;
    a motor attainment temperature estimation portion, which estimates an attainment temperature of a rear wheel motor at the time of automatically driving with the rear wheel plan driving force obtained by the rear wheel plan driving force calculation portion;
    a motor temperature determination portion, which determines whether the attainment temperature of the rear wheel motor estimated by the motor attainment temperature estimation portion is lower than an upper limit temperature set in advance; and
    a vehicle control portion, which drives and controls the vehicle taking the rear wheel plan driving force as a target driving force when a determination is made that the attainment temperature of the rear wheel motor estimated by the motor temperature determination portion is lower than the upper limit temperature set in advance, and
    when a determination is made that the attainment temperature of the rear wheel motor estimated by the motor temperature determination portion is higher than the upper limit temperature set in advance, changes the front and rear distribution ratio within a range in which excessive slip does not occur at the front wheels and drives and controls the vehicle taking the rear wheel plan driving force under which the attainment temperature of the rear wheel motor being estimated is lower than the upper limit temperature set in advance as the target driving force.

2. A control method of a four-wheel drive vehicle which is capable of driving automatically and in which a driving source of rear wheels is a motor, comprising:
    a weight ratio calculation process, in which a weight ratio of each driving wheel of the vehicle at the time of automatic driving is calculated;
    a front and rear distribution ratio calculation process, in which a front and rear distribution ratio of a driving force of the vehicle is calculated from the weight ratio calculated in the weight ratio calculation process;
    a rear wheel plan driving force calculation process, in which a rear wheel plan driving force is calculated from the front and rear distribution ratio calculated in the front and rear distribution ratio calculation process and an action plan required driving force;
    a rear wheel motor temperature estimation process, in which a temperature of a rear wheel motor in the case of being driven by the rear wheel plan driving force calculated in the rear wheel plan driving force calculation process is estimated;
    a rear wheel motor temperature determination process, in which a confirmation is made on whether an attainment temperature of the rear wheel motor estimated in the rear wheel motor temperature estimation process is lower than an upper limit value of the temperature in the action plan;
    a rear wheel plan driving force recalculation process, in which when a determination is made that the attainment temperature of the rear wheel motor estimated in the rear wheel motor temperature determination process is higher than the upper limit value of the temperature, the front and rear distribution ratio is changed within a range in which excessive slip does not occur at the front wheels, and the rear wheel plan driving force under which the attainment temperature of the rear wheel motor being estimated is lower than the upper limit temperature set in advance is recalculated; and
    an automatic driving implementation process, in which the automatic driving of the vehicle is implemented taking the rear wheel plan driving force under which the attainment temperature of the rear wheel motor being estimated is lower than the upper limit temperature set in advance as a target driving force.

* * * * *